(12) United States Patent
Lowney et al.

(10) Patent No.: US 8,079,509 B2
(45) Date of Patent: Dec. 20, 2011

(54) BRAZED ALUMINUM LAMINATE MOLD TOOLING

(75) Inventors: Matthew T. Lowney, Davisburg, MI (US); Michael Wasylenko, Metamora, MI (US); Anthony Nicholas Tanascu, Washington, MI (US)

(73) Assignee: FloodCooling Technologies, LLC, Troy, MI (US)

( * ) Notice: Subject to any disclaimer, the term of this patent is extended or adjusted under 35 U.S.C. 154(b) by 0 days.

(21) Appl. No.: 12/393,070

(22) Filed: Feb. 26, 2009

(65) Prior Publication Data

US 2009/0214890 A1 Aug. 27, 2009

Related U.S. Application Data

(60) Provisional application No. 61/031,450, filed on Feb. 26, 2008.

(51) Int. Cl.
*B23K 31/02* (2006.01)
*B29C 33/40* (2006.01)

(52) U.S. Cl. ............ 228/262.51; 228/190; 228/262.5; 264/219; 264/225; 428/636

(58) Field of Classification Search ........... 228/262.5, 228/262.51, 190; 264/35, 219, 225; 428/636
See application file for complete search history.

(56) References Cited

U.S. PATENT DOCUMENTS

| | | | |
|---|---|---|---|
| 3,024,002 A * | 3/1962 | Beck | 165/166 |
| 3,381,897 A * | 5/1968 | Wennerstrom | 239/127.1 |
| 3,392,045 A | 7/1968 | Holub | |
| 3,558,886 A | 1/1971 | Carver | |
| 3,673,678 A | 7/1972 | Moreau et al. | |
| 4,608,698 A * | 8/1986 | Moller et al. | 373/130 |
| 4,752,352 A | 6/1988 | Feygin | |
| 4,760,849 A | 8/1988 | Kropf | |
| 5,031,483 A | 7/1991 | Weaver | |

(Continued)

FOREIGN PATENT DOCUMENTS

JP S58-102734 A 6/1983

(Continued)

OTHER PUBLICATIONS

Bales, Royster, and McWithey, "Fabrication and Evaluation of Brazed Titanium-Clad Borsic®/Aluminum Skin-Stringer Panels", NASA Technical Paper 1674, Jul. 1980, 41 pages.

(Continued)

*Primary Examiner* — Jessica L Ward
*Assistant Examiner* — Devang R Patel
(74) *Attorney, Agent, or Firm* — Brooks Kushman P.C.

(57) ABSTRACT

A laminate aluminum block for forming an article includes a series of aluminum laminate plates to collectively form a tool body for forming an article in a forming operation. A series of aluminum brazing layers are formed for brazing together adjacent aluminum laminate plates. The series of aluminum laminate plates and the series of aluminum brazing layers are deoxidized. Draining apertures are formed through a plurality of the series of aluminum laminate plates. The series of aluminum laminate plates are stacked alternating with the aluminum brazing layers between adjacent aluminum laminate plates without a flux. The stacked series of alternating aluminum plates and aluminum brazing layers are pressed. The stacked series of alternating aluminum plates and aluminum brazing layers are heated in a vacuum furnace to a temperature wherein the aluminum brazing layers braze the aluminum laminate plates together and excess braze material drains from the draining apertures.

20 Claims, 12 Drawing Sheets

U.S. PATENT DOCUMENTS

| | | | |
|---|---|---|---|
| 5,192,623 A | 3/1993 | Gewelber | |
| 5,589,204 A | 12/1996 | Wohlgemuth | |
| 6,581,640 B1 | 6/2003 | Barron | |
| 6,587,742 B2 | 7/2003 | Manuel et al. | |
| RE38,396 E | 1/2004 | Gellert | |
| 6,677,054 B1 | 1/2004 | Hermann et al. | |
| 7,195,223 B2 | 3/2007 | Manuel et al. | |
| 7,234,930 B2 | 6/2007 | Niewels et al. | |
| 7,296,442 B2 | 11/2007 | Flynn | |
| 2003/0031814 A1 | 2/2003 | Hutchinson et al. | |
| 2005/0040210 A1* | 2/2005 | Sandin | 228/121 |
| 2005/0064061 A1 | 3/2005 | Eichlseder | |
| 2006/0055085 A1 | 3/2006 | Nakagawa et al. | |
| 2006/0249872 A1* | 11/2006 | Manuel et al. | 264/225 |
| 2008/0003323 A1 | 1/2008 | Manuel et al. | |
| 2008/0011417 A1* | 1/2008 | Manuel et al. | 156/308.2 |
| 2008/0017694 A1 | 1/2008 | Schnell et al. | |

FOREIGN PATENT DOCUMENTS

| | | | |
|---|---|---|---|
| JP | S63-015707 A | | 1/1988 |
| JP | 8216304 A | | 8/1996 |
| JP | 2002205131 A | | 7/2002 |
| JP | 2004195720 A | | 7/2004 |
| JP | 2005095918 A | | 4/2005 |
| JP | 2005193274 A | * | 7/2005 |
| JP | 2005264316 A | | 9/2005 |
| WO | 2010/099450 A2 | | 9/2010 |
| WO | 2010/099450 A3 | | 9/2010 |

OTHER PUBLICATIONS

International Search Report and Written Opinion for corresponding PCT Application No. PCT/US2009/035256, mailed Apr. 27, 2009, 9 pages.

* cited by examiner

BRAZED ALUMINUM LAMINATE MOLD TOOLING

CROSS-REFERENCE TO RELATED APPLICATIONS

This application claims the benefit of U.S. provisional application Ser. No. 61/031,450 filed Feb. 26, 2008, the disclosure of which is incorporated in its entirety by reference herein.

BACKGROUND

1. Technical Field

Various embodiments of the invention relate to methods for brazing aluminum laminate mold tooling, and tooling formed thereby.

2. Background Art

Various tools are conventionally utilized for forming articles using various forming processes, such as injection molding, blow molding, reaction injection molding, die casting, stamping and the like. These tools often include a core block, a cavity block and inserts. The blocks each having opposing forming surfaces for collectively forming an article therebetween. The blocks are often formed separately, and one block translates relative to the other for closing, forming the article, opening, removing the article, and repeating these steps. Often, the blocks are each formed from a solid block of material that is capable of withstanding the stresses, pressures, impacts and other fatigue associated with the forming processes.

These tool components are commonly cooled using cooling channels below the component surface. The cooling efficiency typically determines the quality of the molded component, and how much time it takes to mold the part into a finished solid manufactured part. The cooling efficiency is dependent on the following: thermal properties of the tool material; the geometry of the cooling channels relative to the tool surface; the amount of cooling surface area relative to molded tool or component surface area; thermal properties of molded material; and molding process environment or conditions.

Typical constraints of the molding processes are the thermal properties of molded material, molding process environment or conditions, and, for some applications, thermal properties of the tool or tool component material. With these constraints considered, opportunities to improve the cooling efficiency exist with the geometry of the cooling channels relative to the tool or tool component surface and the amount of cooling surface area relative to molded tool, or component, surface area. Conventional machining and manufacturing methods are limited to how the cooling channels can be designed into the tool, because they are formed using a drill and must consider tool geometry. Therefore, the laminate tool process presents great opportunity to improve cooling efficiency because of the ability to create large surface area conformal cooling channels, and undulations in cooling channel surface to induce turbulent flow.

Aluminum brazing is typically performed on small surface areas required to be brazed and components that have a high volume/mass ratio. The most common type of aluminum brazing is performed in a nitrogen atmosphere using a flux braze process. Other brazing processes are fluxless vacuum brazing. Braze filler metals for flux atmosphere brazing includes foils and/or pastes.

SUMMARY

An embodiment discloses a method for forming a laminate aluminum mold block for forming an article in a forming operation. A series of aluminum laminate plates are formed to collectively form a tool body for forming an article in a forming operation. A series of aluminum brazing layers are formed for brazing together adjacent aluminum laminate plates. The series of aluminum laminate plates and the series of aluminum brazing layers are deoxidized. The series of aluminum laminate plates are stacked alternating with the aluminum brazing layers between adjacent aluminum laminate plates. The stacked series of alternating aluminum plates and aluminum brazing layers are pressed. The stacked series of alternating aluminum plates and aluminum brazing layers are heated to a temperature wherein the aluminum brazing layers braze the aluminum laminate plates together.

Another embodiment discloses a method for forming a laminate aluminum mold block for forming an article in a forming operation. A series of aluminum laminate plates are formed to collectively form a tool body for forming an article in a forming operation. A series of aluminum foil sheets are formed for brazing together adjacent aluminum laminate plates. The series of aluminum laminate plates are stacked alternating with the aluminum foil sheets between adjacent aluminum laminate plates without a flux. The stacked series of alternating aluminum plates and aluminum foil sheets are pressed. The stacked series of alternating aluminum plates and aluminum foil sheets are heated in a vacuum furnace to a temperature wherein the aluminum foil sheets braze the aluminum laminate plates together.

Another embodiment discloses a method for forming a laminate aluminum mold block for forming an article in a forming operation. A series of aluminum laminate plates are formed to collectively form a tool body for forming an article in a forming operation. A series of aluminum foil sheets are formed for brazing together adjacent aluminum laminate plates. Draining apertures are formed through a plurality of the series of aluminum laminate plates. The series of aluminum laminate plates are stacked alternating with the aluminum foil sheets between adjacent aluminum laminate plates. The stacked series of alternating aluminum plates and aluminum foil sheets are pressed. The stacked series of alternating aluminum plates and aluminum foil sheets are heated to a temperature wherein the aluminum foil sheets braze the aluminum laminate plates together and excess braze material drains from the draining apertures.

DETAILED DESCRIPTION OF EMBODIMENTS

Figure 1:
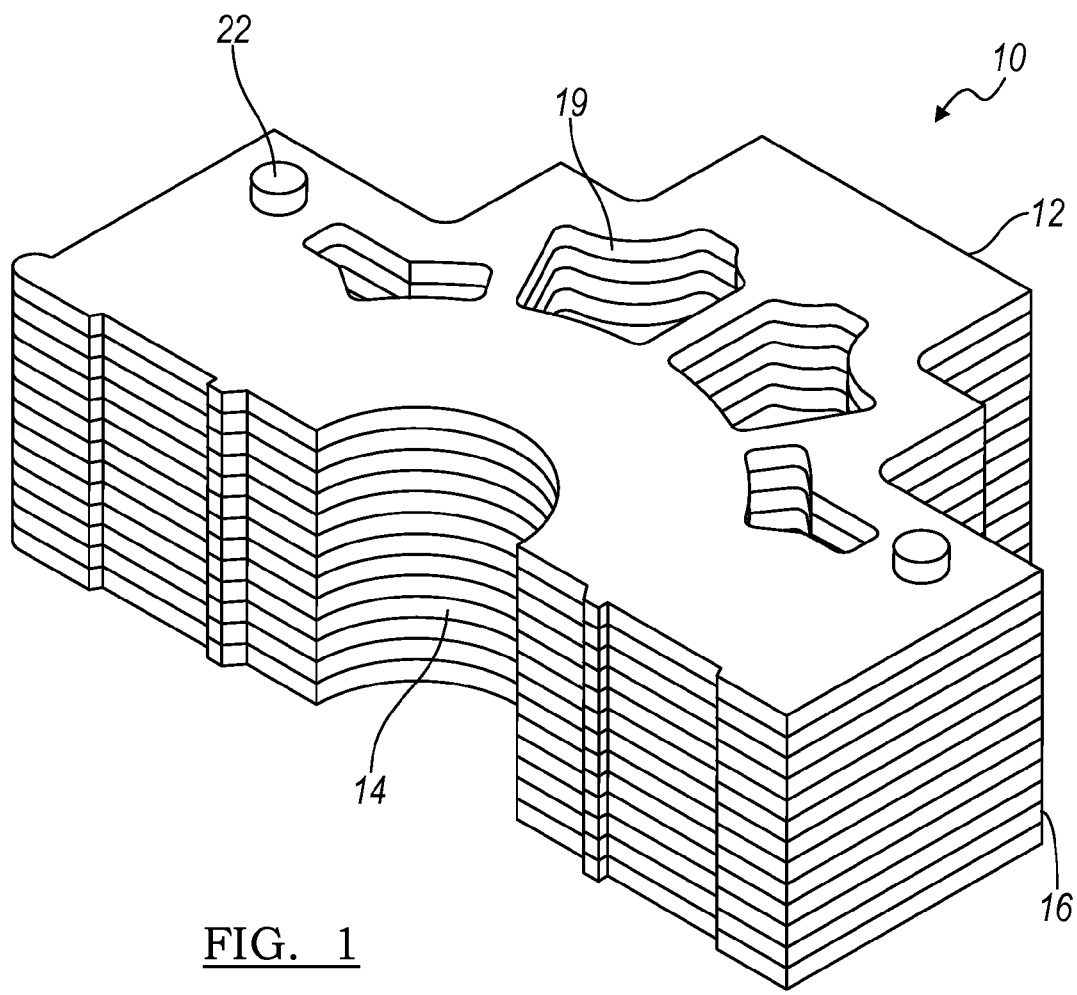
FIG. 1 is a perspective view of a tool illustrating an embodiment of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

The laminate tool process presents great opportunity to improve cooling efficiency because of the ability to create large surface area conformal cooling channels, undulations in cooling channel surface to induce turbulent flow, and reduction in thermal mass. Reduction in thermal mass can also improve the cooling efficiency by reducing energy storage, with a drawback that the design of the tool must still withstand the applicable structural requirements. To utilize the laminate tool process for aluminum tool applications, and achieve the mechanical properties required for the molding processes, aluminum brazing of the laminated plates is utilized.

Braze filler metals for fluxless vacuum brazing include foils. A critical challenge in brazing aluminum is the prevention of oxidation of the aluminum. Any form of oxidation may inhibit brazing of the material. In the atmosphere flux brazing process, the flux commonly contains Magnesium which is utilized to react with any oxides that exist on the base aluminum, or that are generated during the heating/brazing process. Some common problems that are inherent with flux brazing is gas entrapment due to out-gassing of the flux, potentially leaving porosity in the braze joint. As a result, the atmosphere flux brazing is limited to small surface areas that allow for a minimal amount of flux with minimal resulting porosity, and also high volume/mass geometry to allow the rapid heating and cooling of braze filler metal and flux in liquid state to allow the flux to perform the deoxidizing function. In the vacuum brazing process, the vacuum furnace allows for an oxygen free environment. However, oxide formation can still occur due to oxides being present within the base metal. Therefore, components are deoxidized prior to vacuum brazing, and components are desired to have a high braze surface area to mass ratio for rapid heating and cooling to minimize any potential for oxidation of braze surfaces.

The construction of aluminum laminated tooling presents significant differences in braze requirements of typical aluminum brazing applications. The laminate tooling process creates large surface area requiring braze. For these reasons a fluxless vacuum brazing process is provided that is specific to the laminate tooling process.

The base material utilized in the exemplary laminated tooling process is 6061 aluminum alloy. This alloy satisfies the requirements of its end use. The laminate tooling process utilizes an assembly of blanks or plates that are cut via laser, water, or other precise methods to the specified design. With reference now to FIGS. 1-4, a tool is illustrated and is referenced generally by numeral 10. The tool 10 is a tool for forming an article in a molding operation, such as in injection molding, blow molding, reaction injection molding, rotomolding, die casting, stamping, extruding, or the like. Alternatively, the tool 10 may be a mandrel that is shaped similar to the article for forming a molding tool, a die casting tool, a stamping tool, or the like, wherein the mandrel is not employed for forming the article. Although one tool 10 is illustrated, the invention contemplates that the tool 10 may be a mold member, which is utilized in combination with one or more mold members, such as an opposed mold half for forming an article collectively therebetween. Although the item 10 is referred to as a tool, the invention contemplates that this item may be a tool, a tool component, or a tool insert.

The tool 10 includes a tool body 12, which has a forming surface 14 for forming the article. The tool body 12 is formed from a multiple layer process, for example, a laminate process, such as that disclosed in U.S. Pat. No. 6,587,742 B2, which issued on Jul. 1, 2003 to Manuel et al.; and U.S. Pat. No. 5,031,483, which issued on Jul. 16, 1991 to Weaver; the disclosures of which are incorporated in their entirety by reference herein.

As illustrated, the tool body 12 is provided by a series of aluminum laminate plates 16. As discussed in the incorporated references, each of the laminate plates 16 may be formed individually from a stock aluminum material by a cutting operation that cuts each laminate plate 16 to a predetermined size such that the series of laminate plates 16 provide a portion of the tool body 12. In one embodiment, each of the laminate plates 16 is cut by a laser for providing a near net shape of the tool body 12 and the forming surface 14, such that minimal machining is required once the laminate plates 16 are assembled. After each of the laminate plates 16 is cut, the plates 16 are stacked, aligned, and assembled.

The tool 10 of one embodiment of the invention is a mold block insert for molding and cooling a neck of a bottle from a blow molding process of a polymer material. The forming surface 14 receives another insert that performs a portion of the mold cavity. The mold cavity insert is engaged to the mold block insert 10 for improved cooling characteristics due to conformal cooling provided by the mold block insert 10. The laminate insert 10 is constructed of thirteen 0.125 inch thick blanks 16. The thickness described is an example for the depicted embodiment. Of course, various thicknesses may be employed within the spirit and scope of the invention. FIGS. 1-4 show the exploded and assembled views of the laminated insert 10. The insert 10 is assembled in sequence with braze foil placed between base metal blanks 16. In comparison to prior art solid aluminum block inserts, the laminate aluminum mold block insert 10 provides conformal cooling, which permits the end user to control cooling of the neck of the bottle, thereby enhancing quality of the bottle, improving cycle time and reducing part failures.

The laser cut aluminum plates 16 are formed from 6061-T6 aluminum. In order for the tolerance of the braze joint to be very high, the base metal in the T6 (hardest) condition is utilized to minimize and prevent any distortion and/or disruption to the surfaces being brazed during the material handling and assembly operations of the laminate tooling process. The braze alloy used for brazing of 6061-T6 aluminum is 4047 aluminum alloy in foil form. The selection of braze alloy material is determined by material flow at liquid state, melting point temperature range, metallurgical compatibility with base alloy, mechanical properties, and commercial availability. Braze foil thickness is determined on the mass of the laminate tool and also the resulting duration of the braze process. A typical thickness for the foil used in a (five inch by eight inch maximum plan view dimension) mold block preform shown in FIGS. 1-5 is 0.003-0.008 inches. Alternatively, the aluminum plates 16 could be clad with a thin layer of 4047 aluminum alloy.

The design of the laminate tool 10 allows for the opportunity to incorporate conformal cooling channels 18 (FIG. 4) within the tool body 12 to improve end product cooling efficiency, to improve internal features to reduce thermal mass of the component for the brazing process and to further improve end product cooling efficiency, and internal features to control the flow of the molten braze alloy and prevent erosion of the braze joints. Additionally, drain holes 19 are provided to drain excess braze material from the tool 10 so as to not obstruct the internal cooling passageways. The excess braze material is also drained to prevent collection of the molten material which may create a weakened void or a leak in the tool 10.

When the design of the laminate tool 10 is complete, data is generated to build the component from 0.125 inch thick blanks 16 of 6061-T6 aluminum. The blanks 16 are cut (via laser, water, or other precise methods) to the engineered shape. The braze foil is also cut to the same shape as the outside profile of the base metal cut blank. After cutting of the blanks 16 is complete, all base metal cut blanks 16 receive mechanical abrasion of their surfaces. This allows for deburring of the blanks, and increases the amount of braze surface area. This operation may be done by dual action sanding of the surfaces. In order to minimize oxidization during abrasion, the media used for this operation should not include any form of an oxide according to at least one embodiment. Silicon Carbide abrasives can be utilized to prevent any introduction of oxides to the surfaces to be brazed. Utilization of a coarse grit sanding media increases the surface area for absorbing the braze material. The blanks 16 may require deburring, which can be performed as a separate process, or may be accomplished by the sanding operation.

Upon completion of mechanical abrasion, the base metal blanks 16 and braze foil are cleaned in an acetone solution, and dried. The next step is to rack the base metal blanks 16 and braze foil and submerge these components into a five percent alkali solution for one to four minutes. The alkali solution allows the base metal blanks 16 and braze foil to be cleaned and remove any contamination. The base metal blanks 16 and braze foil are removed from the alkali solution and rinsed with deionized water for neutralization. The base metal blanks 16 and braze foil are then submerged into an eight to twelve percent acid (hydrofluoric and nitric) solution for two to six minutes. The acid solution provides the deoxidation of the braze surfaces.

Upon removal of the base metal blanks 16 and braze foil from the acid, the parts are rinsed with deionized water for neutralization and then dried with clean dry compressed air. When drying of the base metal blanks 16 and braze foil is complete, the assembly of the laminate tool 10 is immediately performed. The laminate tool 10 is assembled with the blanks 16 in a horizontal plane. A first blank 20 is provided with alignment pins 22 fixtured to the blank 20. The remaining plates 16 have clearance holes 24 to align the blanks 16 together and allow floating, and no interference, of the plates 16 at braze temperature. The clearance holes 24 may also be provided with vents or notches to prevent build-up of braze material and for outgassing during the brazing process.

Starting with the first base metal blank 20, a piece of braze foil is placed between each base metal blank 16 as it is stacked up. The holes are punched through the braze foil in the location of the internal features of the laminate tool 10 to allow a path to the brazing environment (or the outside of laminate tool 10). When the assembly of the laminate tool 10 is completed, the laminate tool 10 is immediately placed into a vacuum furnace. If the laminate tool 10 cannot be immediately placed in the vacuum furnace, the components can be stored in an inert environment container which is free of oxygen.

Figure 5:
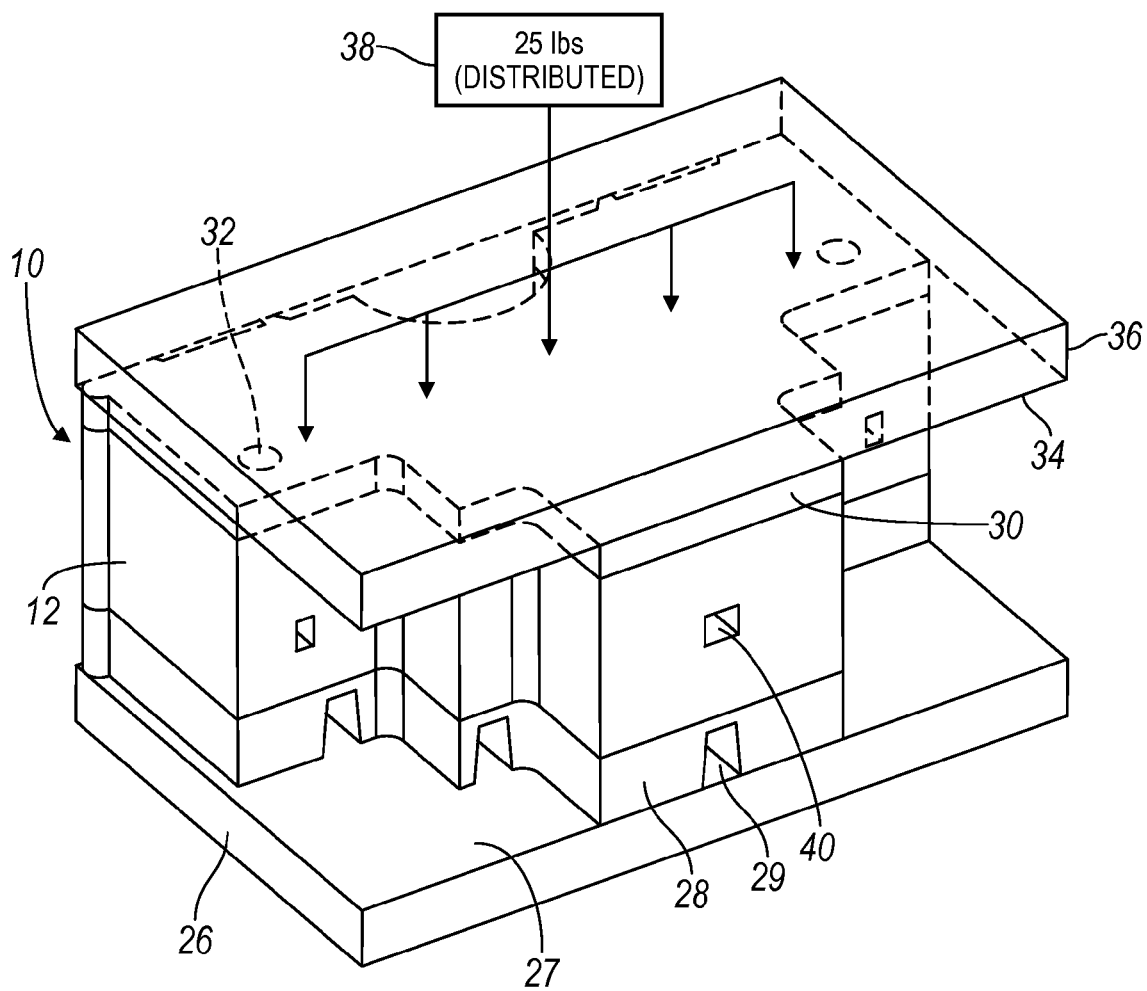
FIG. 5 is a perspective view of the tool of FIG. 1 in a furnace fixture.

Referring now to FIG. 5, the vacuum furnace set-up can be optimized for the brazing process of the laminate tool 10. FIG. 5 illustrates one such set-up according to an embodiment of the invention. A drip pan can be installed to catch any excess braze and protect the furnace. A precision ground graphite plate 26 is installed in the drip pan to provide a flat base for the laminate tool 10 throughout the temperature range of the brazing cycle, and allows for flatness of the part when brazing is completed. Ceramic plates 27 are installed on top of the graphite plate 26 to insulate the laminate tool from the high thermal conductive graphite and isolate radiated furnace energy to laminate tool 10.

An aluminum vent/drain plate 28 is installed on top of the ceramic plates 27. The vent/drain plate 28 is the same profile as the laminate tool 10, and has passages 29 located in the location of the drain holes 19 in the laminate tool 10, and extend to the outside of the plate 28 so the brazing environment is allowed into the internal features of the laminate tool 10. The vent/drain plate 28 is coated with Boron Nitride to prevent brazing of this plate 28 to the laminate tool 10.

The laminate tool 10 is placed on the vent/drain plate 28. A weight plate 30 is then installed on top of the laminate tool 10. It also has the same profile as the laminate tool 10 and contains clearance holes 32 for the alignment pins 22. The weight plate 30 is coated with Boron Nitride to prevent brazing of this plate 30 to the laminate tool 10. The function of this plate 30 is to allow even weight distribution on the laminate tool surface 10 and not on the alignment pins 22, which protrude through the top of the part 10. The braze area of the laminate tool is approximately twenty square inches. The weight results in a clamping load of 1.3 to 1.5 pounds per square inch (psi). In this example, the clamp load was 1.3 psi. Rather than using a weight plate, high temperature springs can apply the clamping load. This results in less thermal mass in the furnace so heating can be faster or more parts can be loaded into the furnace at one time. When high temperature springs are used, loads of up to twenty psi can be achieved which in turn enables thinner layers of foil, such as 0.002 to 0.003 inches.

Ceramic plates 34 are installed on top of the laminate tool 10. A graphite plate 36 is installed on top of the ceramic plates 34, and a weight 38 with a calculated mass, specific for the laminate tooling process, is placed on top of the graphite plate 36. The graphite plate 36 on top of the laminate tool 10 allows even weight distribution across the surface of the laminate tool 10. The mass is determined using a calculation which considers cross sectional surface area and the number of base metal blanks 16 of the laminate tool 10. The mass allows compression of the blanks 16 and maintains flatness and consistent braze joint thickness. For the depicted embodiment, the weight 38 is twenty-five pounds.

Thermocouples are used during the brazing process that are sheathed in an austenitic nickel-chromium-based superalloy, such as Inconel®, from Special Metals Corporation in Huntington, W. Va., USA. Each tool 10 has a passage 40 to install the thermocouple to be in contact with the center, and/or last place to reach braze temperature, of the laminate tool 10. Although the brazing process occurs in high vacuum levels, the possibility of oxide is still present due to oxides that may be existing within the base metal and peripheral materials. To further prevent oxidation, high purity Magnesium turnings are placed in a ceramic crucible within the vacuum furnace hot zone. During the brazing cycle the Magnesium heats up and reacts with any oxygen that may be present and prevent oxidation of the aluminum. The required mass of Magnesium turnings is dependent on the duration of the brazing cycle.

Prior to performing the aluminum brazing process in the vacuum furnace, a vacuum furnace cycle is heated to 2000 degrees Fahrenheit in a reducing, hydrogen, atmosphere to remove any oxides that may be present in the furnace hot zone. The reducing vacuum furnace cycle is performed without the aluminum laminate tool 10, but with all braze set-up peripheral materials as previously discussed, except the Magnesium, which is only introduced into the furnace with the tool 10. The vacuum furnace brazing cycle also employs specific high tolerance temperature control throughout the brazing cycle.

With the reducing furnace cycle completed and the laminate tool 10 braze set-up complete, the aluminum braze cycle for one embodiment is initiated and is described as follows: the vacuum furnace chamber is pumped down to $10^{-5}$ to $10^{-6}$ torr vacuum (this vacuum is maintained throughout cycle); the heat is ramped to 750 degrees Fahrenheit at a rate of thirty degrees Fahrenheit per minute until the laminate part 10 reaches 750 degrees Fahrenheit; the heat is then ramped to 1020 degrees Fahrenheit at a rate of thirty degrees Fahrenheit per minute until laminate part reaches 1020 degrees Fahrenheit; the temperature is held for a maximum of ten minutes at 1020 degrees Fahrenheit; the heat is then ramped to control thermocouple temperature of 1095 degrees Fahrenheit at a rate of thirty degrees Fahrenheit per minute; when the laminate part 10 temperature reaches 1095 degrees Fahrenheit, plus or minus five degrees Fahrenheit a cooling rate is ramped at a maximum rate permitted by the vacuum furnace to 985 degrees Fahrenheit; when laminate part reaches 985 degrees Fahrenheit, turn off the heat and cool at maximum rate to room temperature. Upon completion of the furnace braze cycle, the part 10 is removed from the furnace, and the set-up is disassembled. The vent/drain plate 28 and weight plate 30 are then removed. The laminate tool 10 is then solution heat treated and T6 hardening process is performed to final material specifications.

Figure 2:
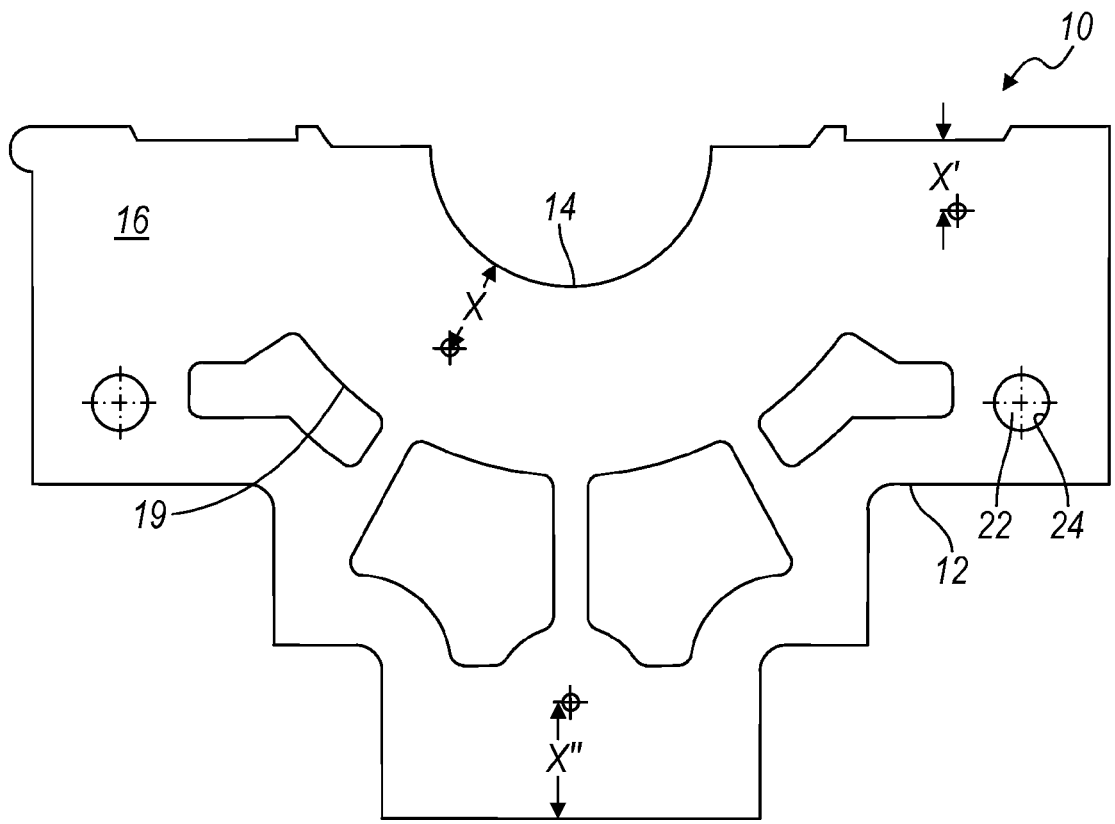
FIG. 2 is a top plan view of the tool of FIG. 1.
Figure 3:
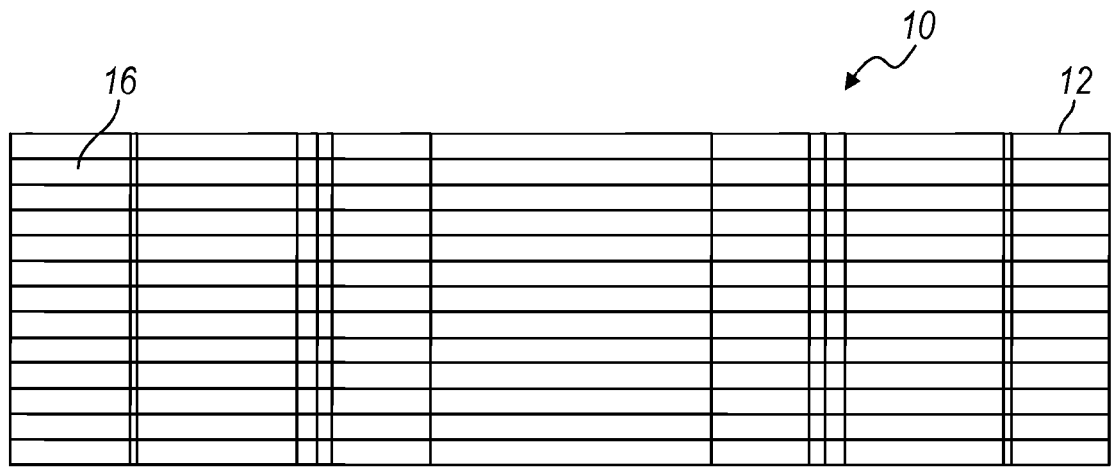
FIG. 3 is a side elevation view of the tool of FIG. 1.
Figure 4:
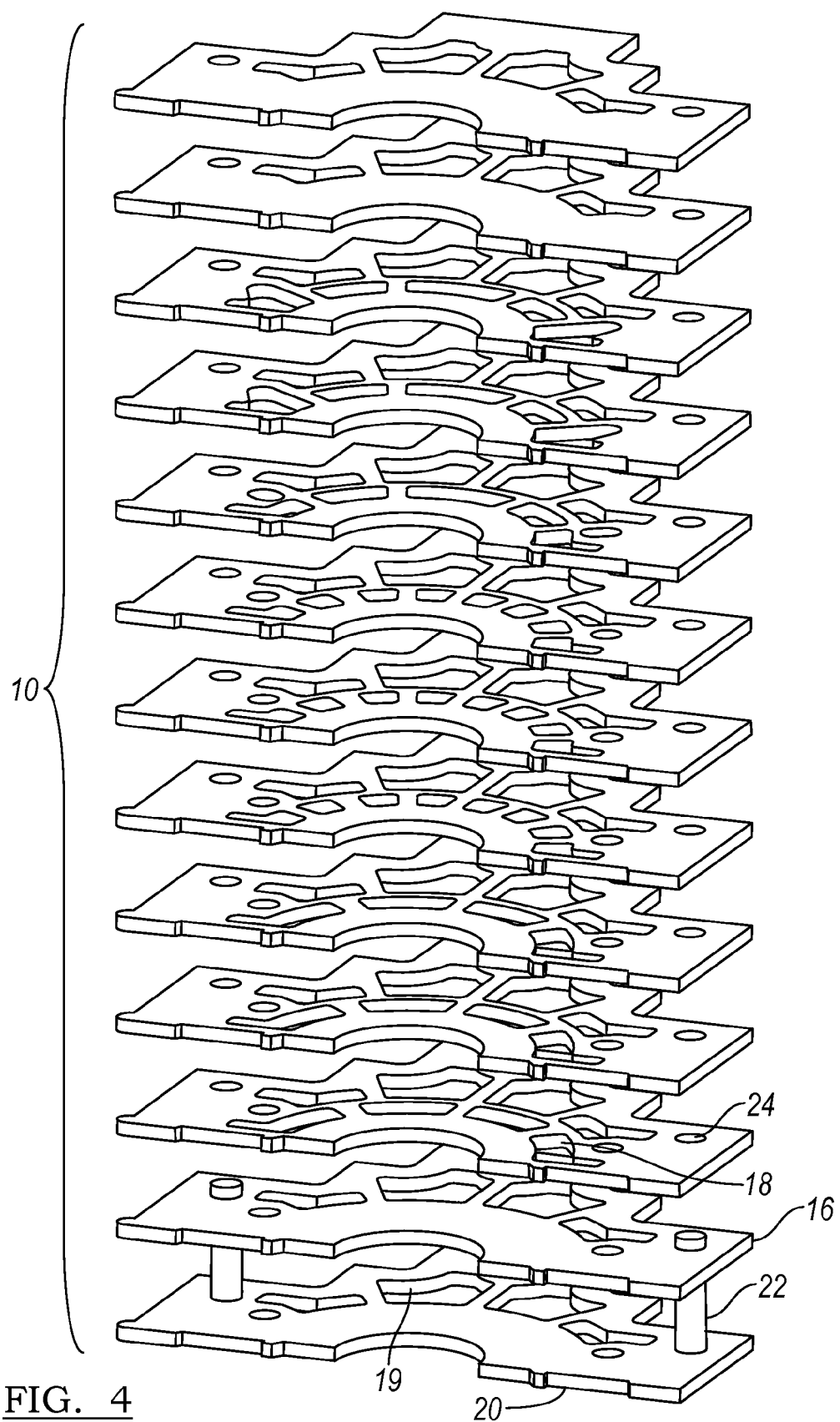
FIG. 4 is an exploded perspective view of the tool of FIG. 1.

Brazed parts 10 can be leak tested to verify success in the brazing operation. If failures are detected, the failures can be analyzed by X-Ray or ultrasonic testing for identifying the failure. Repeat testing has found that prolonged exposure to the brazing temperatures within the furnace, may result in seepage of the brazing material away from an outer periphery of the part 10. Referring to FIG. 2, a maximum degas distance is represented at multiple locations labeled x, x' and x". If the brazing material withdraws past this maximum distance, then the braze cycle should be modified to prevent excessive seepage. One way to reduce the time required in the brazing operation, and therefore even out the heat transfer, is to reduce the overall thermal mass in the furnace. Reduction of thermal mass can be obtained by reduction in the part 10 or in the furnace fixture.

Figure 6:
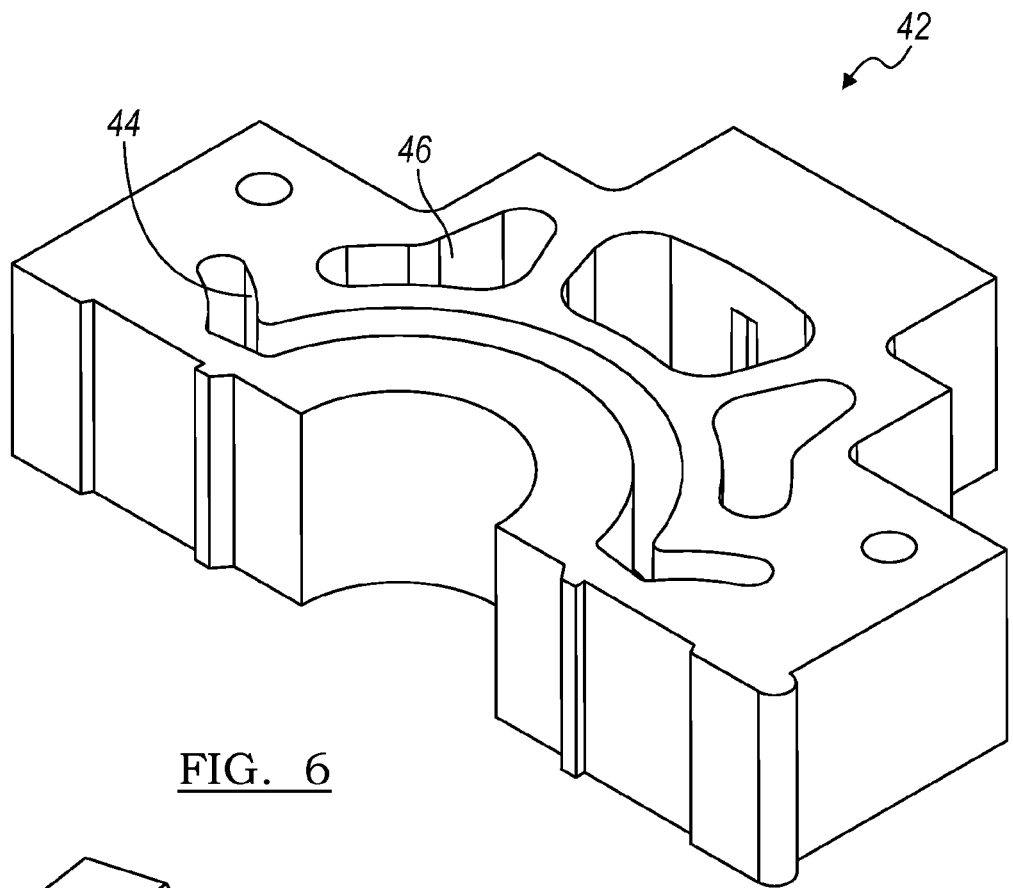
FIG. 6 is a perspective view of a tool illustrating another embodiment of the present invention.
Figure 7:
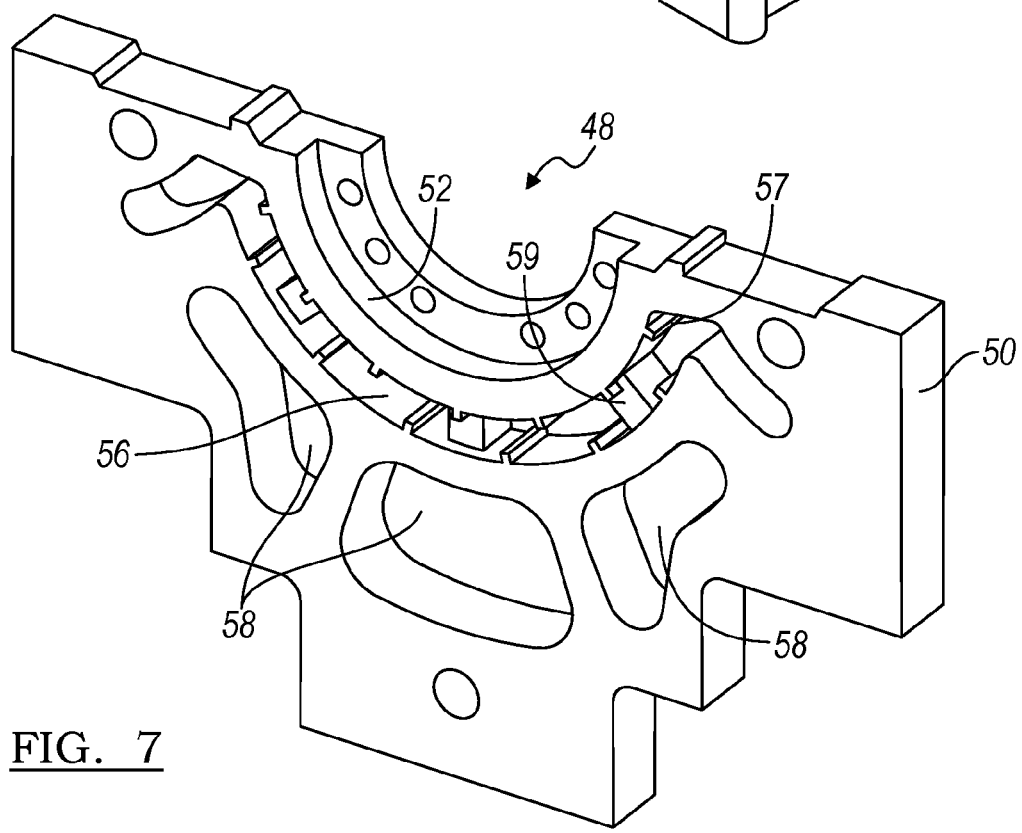
FIG. 7 is a perspective cross section view of a tool illustrating another embodiment of the present invention.

FIG. 6 illustrates a portion of aluminum laminate tool 42 according to another embodiment. The tool 42 illustrates that variations in cooling channels 44 and drain holes 46 can be employed.

With reference now to FIGS. 7-10, another tool is illustrated and is referenced generally by numeral 48. The tool 48 is a tool for forming an article in a molding operation. Although the item 48 is referred to as a tool, the invention contemplates that this item may be a tool, a tool component, or a tool insert.

The tool 48 includes a tool body 50, which has a machined surface 52 for receipt of the tool insert. As illustrated, the tool body 50 is provided by a series of aluminum laminate plates 54. Each of the laminate plates 54 may be formed individually from a stock aluminum material by a cutting operation that cuts each laminate plate 54 to a predetermined size such that the series of laminate plates 54 provide a portion of the tool body 50. In one embodiment, each of the laminate plates 54 is cut by a laser for providing a near net shape of the tool body 50 and the finished surface 52, such that minimal machining is required once the laminate plates 54 are assembled. After each of the laminate plates 54 is cut, the plates 54 are stacked, aligned, and assembled.

The tool 48 of one embodiment of the invention is a mold block insert for molding and cooling a neck of a bottle from a blow molding process of a polymer material. The finished surface 52 receives another insert that performs a portion of the mold cavity. The mold cavity insert is engaged to the mold block insert 48 for improved cooling characteristics due to conformal cooling provided by the mold block insert 48. The laminate insert 48 is constructed of thirteen 0.125 inch thick blanks 54. The thickness described is an example for the depicted embodiment. Of course, various thicknesses may be employed within the spirit and scope of the invention. FIGS. 7-10 show the exploded and assembled views of the laminated insert 48. The insert 48 is assembled in sequence with braze foil placed between base metal blanks 54. In comparison to prior art solid aluminum block inserts, the laminate aluminum mold block insert 48 provides conformal cooling, which permits the end user to control cooling of the neck of the bottle, thereby enhancing quality of the bottle, improving cycle time and reducing part failures.

The laser cut aluminum plates 54 are formed from 6061-T6 aluminum. In order for the tolerance of the braze joint to be very high, the base metal in the T6 (hardest) condition is utilized to minimize and prevent any distortion and/or disruption to the surfaces being brazed during the material handling and assembly operations of the laminate tooling process. The braze alloy used for brazing of 6061-T6 aluminum is 4047 aluminum alloy in foil form. The selection of braze alloy material is determined by material flow at liquid state, melting point temperature range, metallurgical compatibility with base alloy, mechanical properties, and commercial availability. Braze foil thickness, (0.003-0.010 inches for this example), is determined on the mass of the laminate tool and also the resulting duration of the braze process. Minimizing braze foil thickness reduces excess braze material, and minimizes resulting braze joint thickness for enhanced mechanical integrity.

The design of the laminate tool 48 allows for the opportunity to incorporate conformal cooling channels 56 (FIGS. 7 and 8) within the tool body 50 to improve end product cooling efficiency, to improve internal features to reduce thermal mass of the component for the brazing process and to further improve end product cooling efficiency, and internal features to control the flow of the molten braze alloy and prevent erosion of the braze joints. The cooling channels 56 may be formed with projections 57 and structural ribs 59 for causing turbulence within the flow of coolant in the channel 56. Further, the ribs 59 enhance the strength of the channels 56 and the tool 48. Additionally, mass reduction holes 58 are provided to reduce mass, reduce thermal mass, and drain excess braze material from the tool 48.

When the design of the laminate tool 48 is complete, data is generated to build the component from 0.125 inch thick blanks 54 of 6061-T6 aluminum. The thickness of the blanks 54 is not limited to 0.125 inch thickness. Blank 54 thickness is driven by the design factors for a particular application and an ability to achieve near net shape of the cooling channels 56, when applicable. The blanks 54 are cut (via laser, water, or other precise methods) to the engineered shape. During the cutting of the blanks 54, the number of each blank 54 may be etched into a surface of the blank 54 to assist in assembling the blanks 54 in the correct order. The braze foil is also cut to the same shape as the outside profile of the base metal cut blank.

After cutting of the blanks 54 is complete, all base metal cut blanks 54 receive mechanical abrasion of their surfaces. This allows for deburring of the blanks, and increases the amount of braze surface area. This operation is done by dual action sanding of the surfaces. In order to minimize oxidization during abrasion, the media used for this operation should not include any form of an oxide according to at least one embodiment. Silicon Carbide abrasives can be utilized to prevent any introduction of oxides to the surfaces to be brazed.

Upon completion of mechanical abrasion, the base metal blanks 54 and braze foil are cleaned in an acetone solution, and dried. The next step is to rack the base metal blanks 54 and braze foil and submerge these components into a five percent alkali solution, which is at a temperature of 130 degrees Fahrenheit, for four to six minutes. The alkali solution allows the base metal blanks 54 and braze foil to be cleaned and remove any contamination. The base metal blanks 54 and braze foil are removed from the alkali solution and rinsed with deionized water for neutralization. The base metal blanks 54 and braze foil are then submerged into an ten to twelve percent acid (hydrofluoric and nitric) solution for four to six minutes. The acid solution provides the deoxidation of the braze surfaces.

Upon removal of the base metal blanks 54 and braze foil from the acid, the parts are rinsed with deionized water for neutralization and then dried with clean dry air. Optimum drying conditions can be performed in a recirculating air oven at a temperature of 300 degrees Fahrenheit to reduce moisture. When drying of the base metal blanks 54 and braze foil is complete, the assembly of the laminate tool 48 can be immediately performed. If assembly of the laminate component 48 is not immediately performed, the components 48 are stored in containers to minimize exposure to the air for minimizing oxidation of the prepared components.

Figure 8:
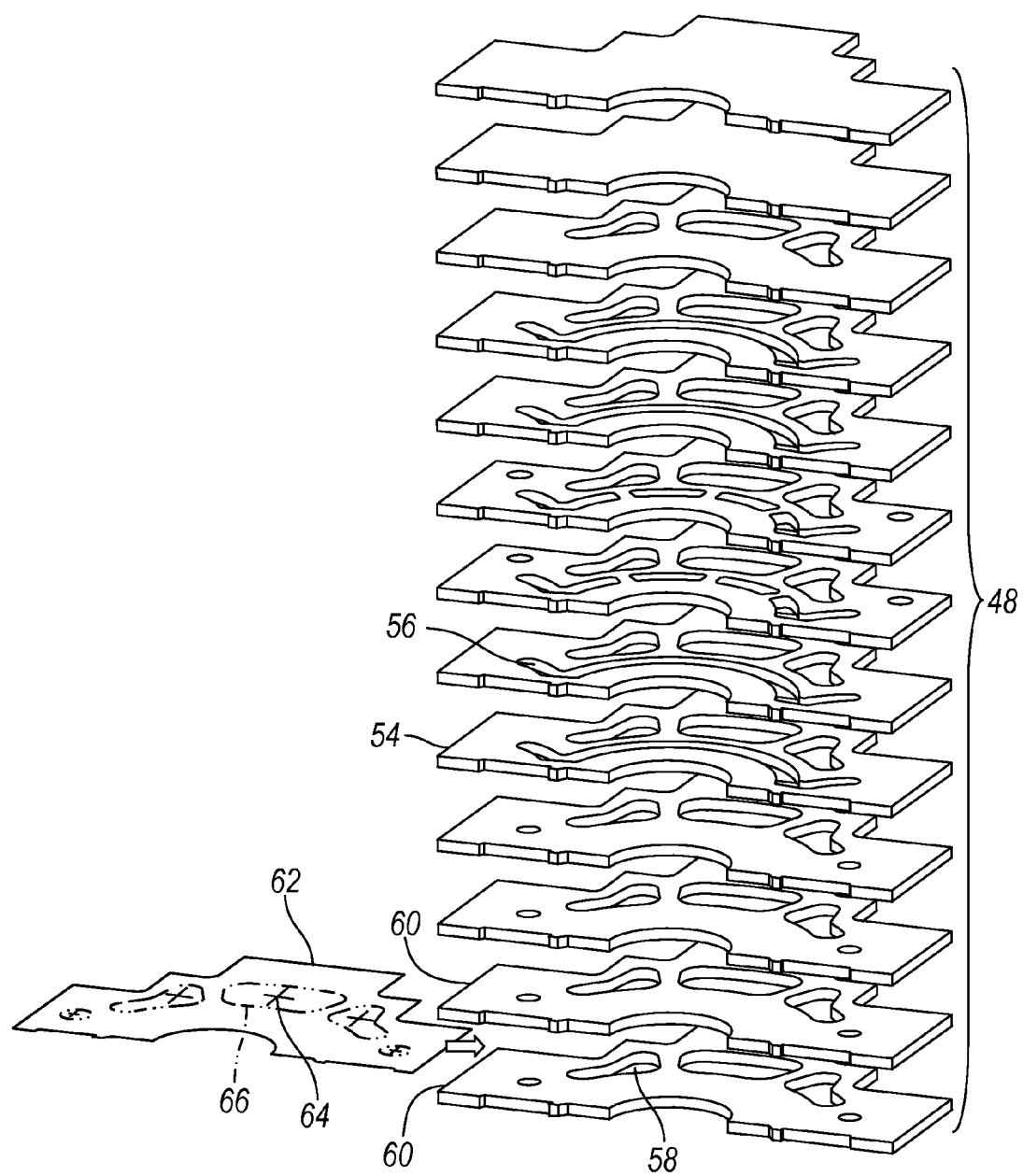
FIG. 8 is an exploded perspective view of the tool of FIG. 7.

The laminate tool 48 is assembled with the blanks 54 in a horizontal plane as in FIG. 8. The assembly of the components 48 may be performed in a dust free area. Manual handling of the blanks 48 and foil may be performed with rubber gloves to minimize contamination introduced on any of the brazing surfaces of the components 48.

Figure 9:
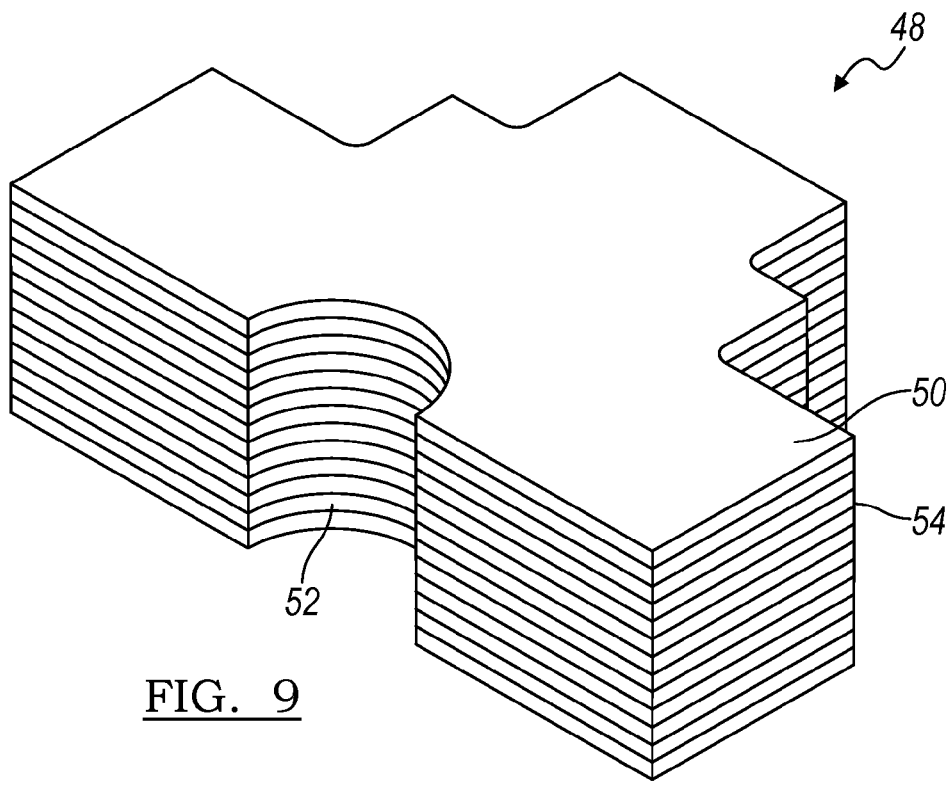
FIG. 9 is a top perspective view of the tool of FIG. 7.
Figure 10:
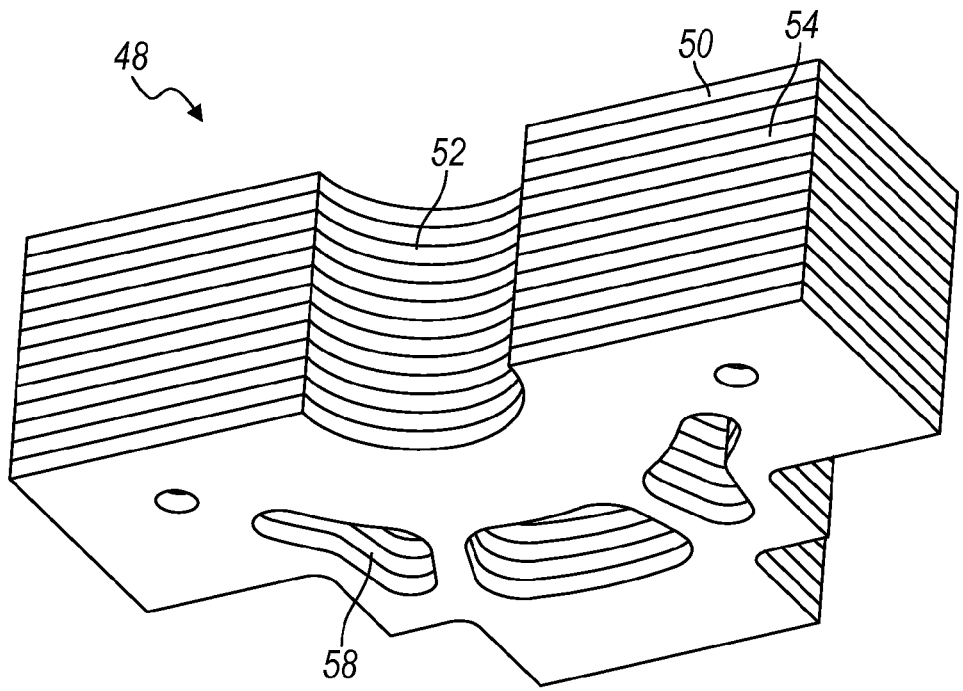
FIG. 10 is a bottom perspective view of the tool of FIG. 7.

Beginning with a first base metal blank 60 placed upon a work surface, a piece of braze foil 62 is placed between each base metal blank 54 as it is stacked up. During the assembly of the laminate component, the braze foil 62 is pierced at piercings 64, (or punched out in relief at apertures 66 shown in phantom), in the location of the internal features of the laminate tool 48. The piercings 64 minimize, and may potentially eliminate, excess braze material. The piercings 64 prevent trapped air in the assembled component 48, thereby eliminating an opportunity for the braze material to blowout during phase change to liquidus state. The piercings 64 also allow all internal features of the component 48 to be in equilibrium with the brazing environment or atmosphere. When the assembly of the laminate component 48 is completed as illustrated in FIGS. 9 and 10, the laminate component 48 is ready to be installed onto a brazing fixture and then immediately placed into a vacuum furnace. If the laminate component 48 cannot be immediately placed in the vacuum furnace, the components 48 can be stored in an inert environment container which is free of oxygen.

Figure 11:
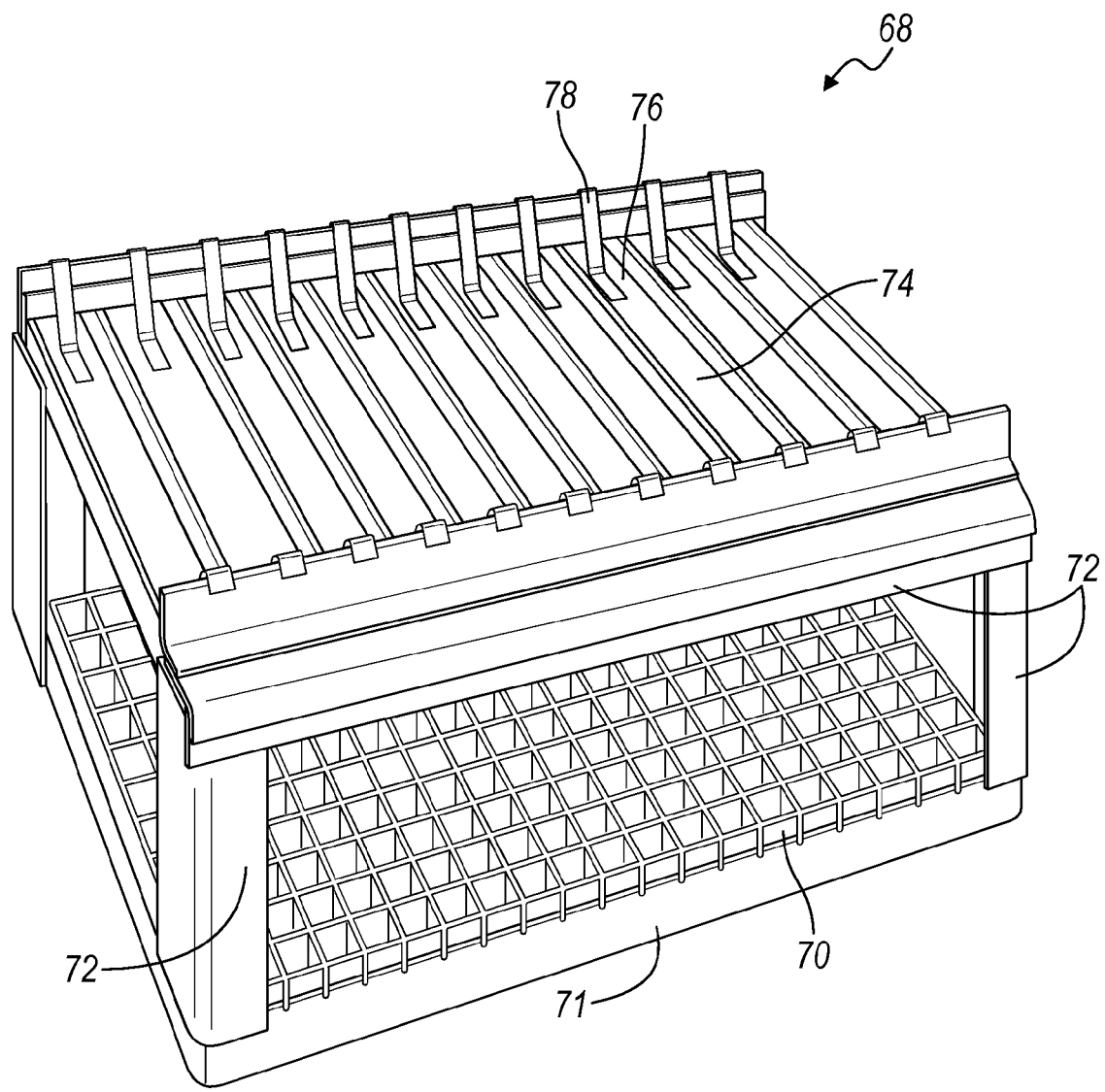
FIG. 11 is a perspective view of a braze fixture illustrating an embodiment of the present invention.

Referring now to FIG. 11, a brazing fixture 68 may be employed for the laminate tooling 48, or component, aluminum brazing process. The brazing fixture 68 is designed and built with materials that have excellent high strength properties and at high temperatures, utilizes a low mass design to prevent a heat sink effect yet providing structural strength, and provides a system to apply distributed forces to the brazed components 48 for compression throughout the braze cycle while maintaining a fixed position of the component 48 on the fixture 68.

The braze fixture 68 includes a base 70, a frame 72, and a top 74. The base 70 is manufactured from an austenitic nickel-chromium-based superalloy sheet, such as Inconel® 750X sheet, from Special Metals Corporation in Huntington, W. Va., USA. The sheet is welded yielding a honeycomb construction. The base 70 is then solution heat treated, age hardened, and top and bottom surfaces machined parallel. Gussets 71 are manufactured from 304 stainless steel, and are welded to the bottom of the base 70 creating an X-brace and perimeter frame for additional structural strength. The base 70 is then stress relieved at a temperature below the age hardening temperature of the sheet material, so the required properties of the sheet material are not affected. The top and bottom of the base 70 are then precision ground on top and bottom to provide flat and parallel surfaces.

The frame 72 of the fixture 68 is manufactured from 304 stainless steel sheet that has been formed to create angles and structure for optimal strength. The components of the frame 72 are welded together then stress relieved. The frame 72 is then fastened to the fixture base 70 utilizing high strength stainless steel fasteners. The top 74 of the fixture 68 is manufactured from 304 stainless steel sheet that has been formed into u-shaped channels 76 for structural strength. Tabs 78 are welded on each end of the u-channels 76 to create a hook. The components of the top 74 are stress relieved. Several of the u-channels 76 are used to create the top 74 of fixture 68, and hook on to the frame 72 of the fixture 68 to maintain position.

Figure 12:
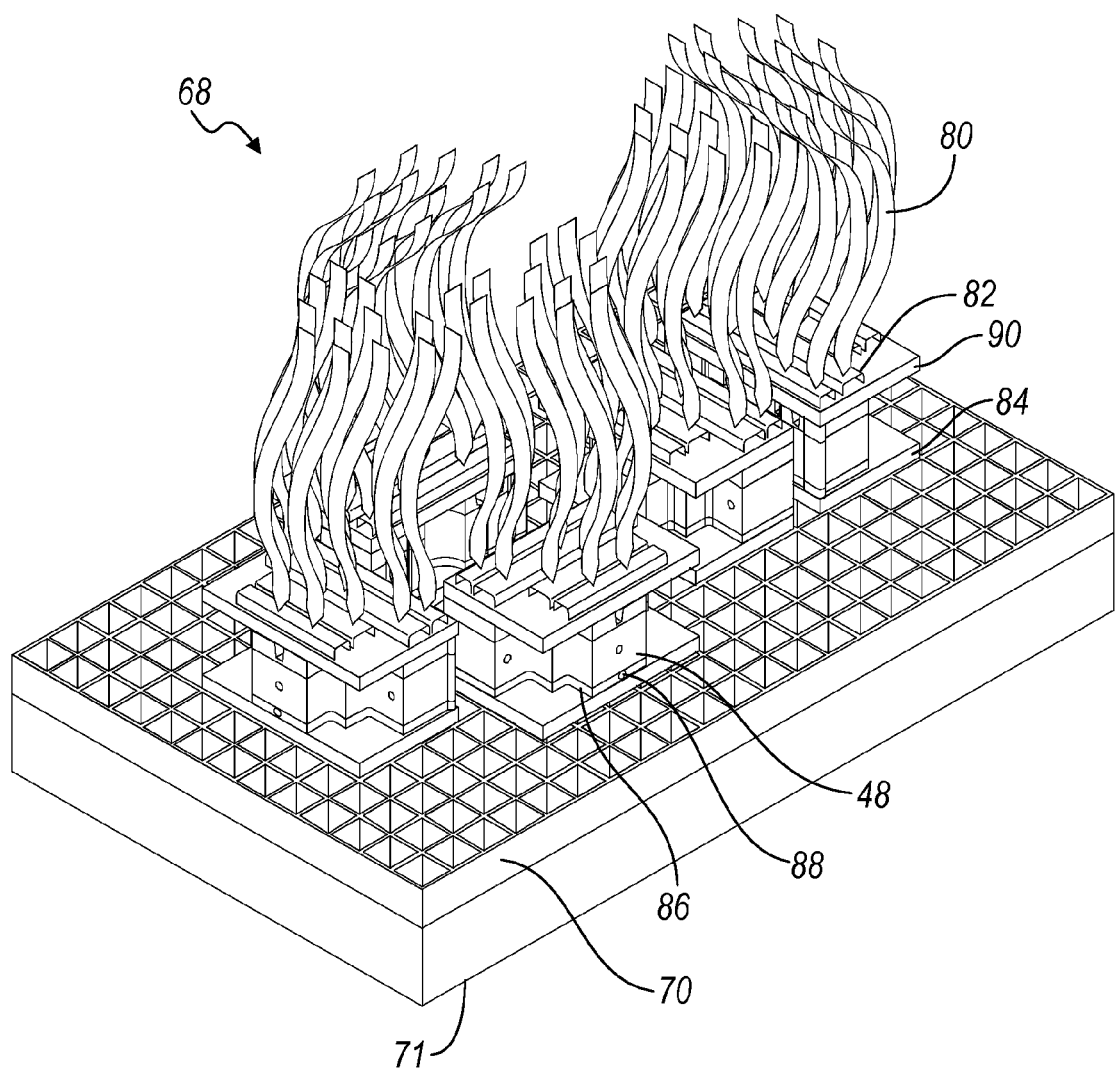
FIG. 12 is a fragmentary perspective view of the braze fixture of FIG. 11 illustrated in cooperation with a plurality of the tools of FIG. 7.
Figure 13:
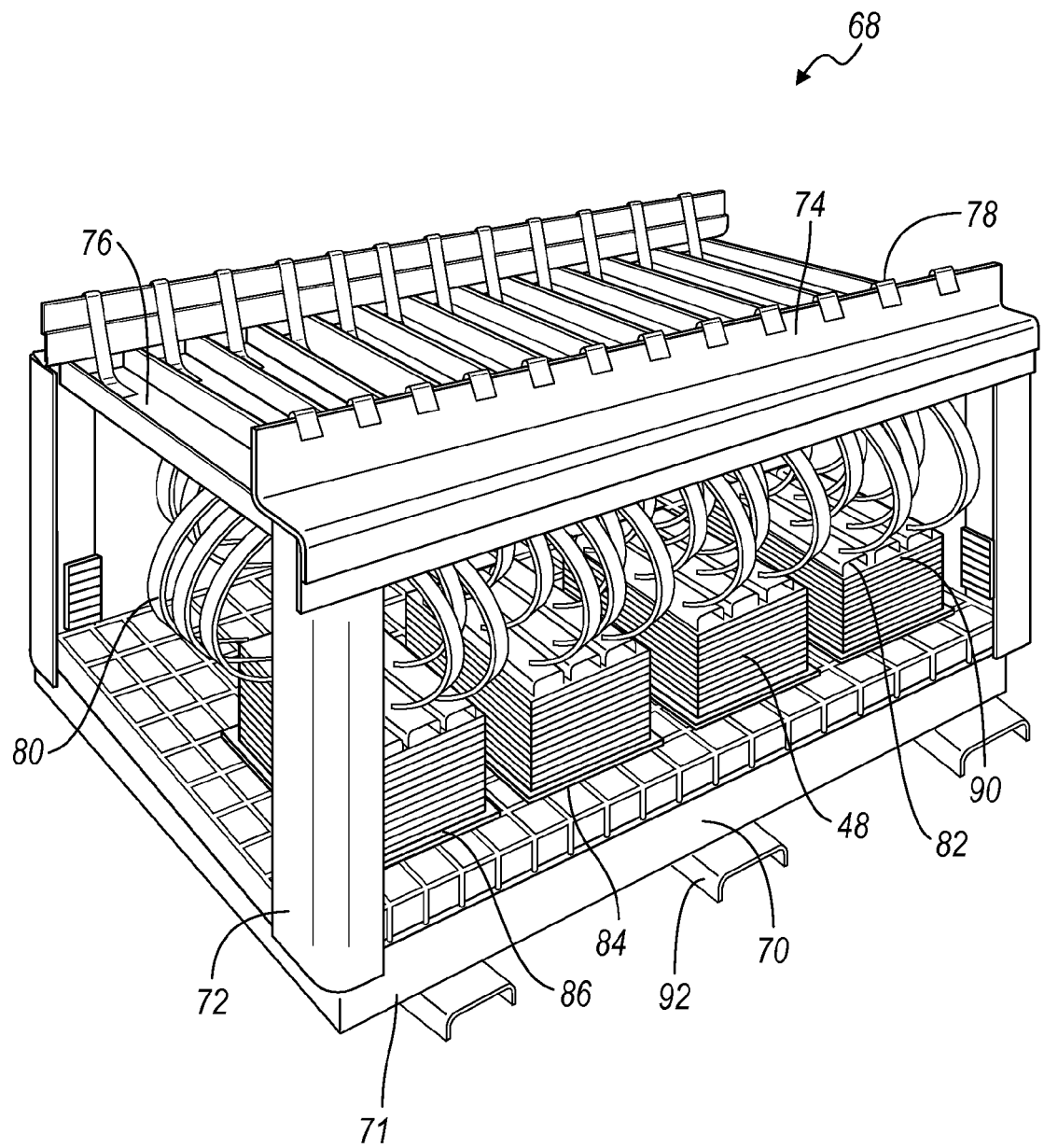
FIG. 13 is another perspective view of the braze fixture of FIG. 11 in cooperation with a plurality of the tools of FIG. 7.

As discussed above, reduction in mass results in reduction of thermal mass, thereby providing a reduction in throughput of the vacuum furnace. Referring now to FIGS. 12 and 13, additional mass can be reduced by utilizing high temperature alloy springs, such as ribbon springs 80 manufactured from an austenitic nickel-chromium-based superalloy sheet, such as Inconel® 750X sheet. The ribbon springs 80 generate a force to be applied to the laminate component 48, instead of applying a weight as in the previous embodiment. The ribbon springs 80 are manufactured from 0.060 inch thick sheet stock and are formed to a specific shape, then solution heat treated and age hardened to maximize mechanical properties and high temperature strength. The ribbon springs 80 maintain their strength and applied force during brazing because the brazing temperatures for aluminum are well below the heat treatment temperatures that would affect the properties of the material. Although ribbon springs 80 are illustrated and described, various spring types may be employed such as coil springs or the like to design to a fixture size and load rate for a specific brazing application.

The ribbon springs 80 provide a force of approximately thirty-five pounds per square inch of the laminated component 48. In order to prevent the ribbon springs 80 from providing point loads upon the laminate component 48, additional supports are employed to distribute the force uniformly over the surface of the laminate component 48. As a result load u-channels 82 manufactured from 304 stainless steel are used, typically 0.7-1.5 inches wide by 0.5 inches tall by desired length. The load u-channels 82 are placed on top of the part 48 with edges facing down. The ribbon springs 80 are placed between the top 74 of the braze fixture 68 and the load u-channels 82 on top of the part 48.

The set-up of the laminate components 48 to be brazed, on the brazing fixture 68 can be optimized for the brazing process. Dependent on the size of laminate component 48, multiple components 48 can be set-up on the fixture 68 for a single furnace run. To determine the layout of multiple components 48, a minimum of 1.5 inches spacing can be maintained between components 48. The following describes a method, for example, for preparing each laminate component 48 for brazing on the braze fixture 68. A rectangular 0.060 inch thick 304 stainless steel sheet base plate 84 is provided 0.25 inch wider than the profile of the component 48 to be brazed. The base plate 84 is placed on the base 70 of the fixture 68 in the determined location. The base plate 84 has been stress relieved, painted with Magnesium Hydroxide, and dried before being used in the set-up. The base plate 84 provides a flat surface for the laminate component 48 and load distribution to the honeycomb base 70.

An aluminum vent/drain plate 86 is installed on top of the base plate 84. The vent/drain plate 86 is the same profile as the laminate component 48, and has passages 88 located in the location of the drain holes 58 in the laminate component 48 and to the outside of the vent plate 86 so the brazing environment/atmosphere is allowed into the internal features of the laminate component 48. The vent/drain plate 86 is painted with Magnesium Hydroxide to prevent brazing of this plate 86 to the laminate component 48. The laminate component 48 is placed on the vent/drain plate 86. Another base plate 84 is then installed on top of the laminate component 48. The base plate 90 in this location, provides a flat surface for load distribution on the laminate component 48 surface.

The load u-channels 82 are placed with the edges on top of the base plate 90 so that the u-channels 82 cover the entire surface of the laminate component 48 and extend just beyond the component 48 in length. A minimum force is determined using a calculation which considers cross-sectional surface area and the number of base metal blanks 84 of the laminate component 48. The force allows compression of the blanks 54, maintaining flatness, constraining the location of the laminate component 48 on the fixture 68, and consistent braze joint thickness. The ribbon springs 80 are installed between the load u-channels 82 and the top 74 of the braze fixture 68. The ribbon springs 80 are compressed to install into the braze fixture 68, and total force is determined by the measurable pre-load of the spring 80 multiplied by the spring rate multiplied by the total number of springs 80 per laminate component 48. This total force is designed to be greater than or equal to the calculated force required during the brazing operation.

Load thermocouples are used during the brazing process that are sheathed in an austenitic nickel-chromium-based superalloy, such as Inconel®, from Special Metals Corporation in Huntington, W. Va., USA. A minimum of two load thermocouples are used and the first is installed in the laminate component 48 closest to center of the fixture 68, and a second in another laminate component 48 on a peripheral region of the fixture 68. Although the brazing process occurs in high vacuum levels, the possibility of oxide is still present due to oxides or oxide bearing medium that may be existing within the base metal and peripheral materials. To further prevent oxidation of the aluminum laminate component 48, high purity Magnesium turnings are placed on top of the braze fixture 68. During the brazing cycle the Magnesium vaporizes in the brazing environment then allowing reaction with any oxygen that may be present and prevent or reduce oxidation of the aluminum. The required mass of Magnesium turnings is dependent on the braze furnace volume and duration of the brazing cycle.

Once all the laminate components 48 are installed on the braze fixture 68 as discussed, the loaded braze fixture 68 can be installed on a furnace load cart. When loading the braze fixture 68 on the furnace load cart, the braze fixture 68 can be installed on a plurality of support cross bars 92. A small amount of Magnesium turnings is also placed into each of the support cross bars 92. The loaded braze fixture 68 is subsequently installed in the vacuum furnace.

The vacuum furnace used for the aluminum brazing process of the laminate tooling 48, or components, may be designed specifically for aluminum brazing. Typically aluminum brazing vacuum furnaces possess the following functionality: a nickel chrome based hot zone which can endure the thermal stress of backfilling and opening at brazing temperatures at approximately 1100 degrees Fahrenheit; a recirculation cooling system for the chamber to allow and maintain an elevated temperature of approximately 140 degrees Fahrenheit; an oversized vacuum system achieving $10^{-4}$-$10^{-5}$ torr; high tolerance temperature control of plus or minus five degrees Fahrenheit through a 1000-1200 degrees Fahrenheit range; while satisfying AMS 2750 standard.

Prior to performing the aluminum brazing process in the vacuum furnace, a vacuum furnace pre-heat cycle is performed heating the chamber to 1000 degrees Fahrenheit at a pressure less than $10^{-4}$ torr. The furnace chamber water temperature may be increased between 100 and 130 degrees Fahrenheit so that relative humidity is decreased to reduce or prevent moisture in the furnace. The furnace chamber water temperature can be increased during the furnace pre-heat cycle.

Figure 14:
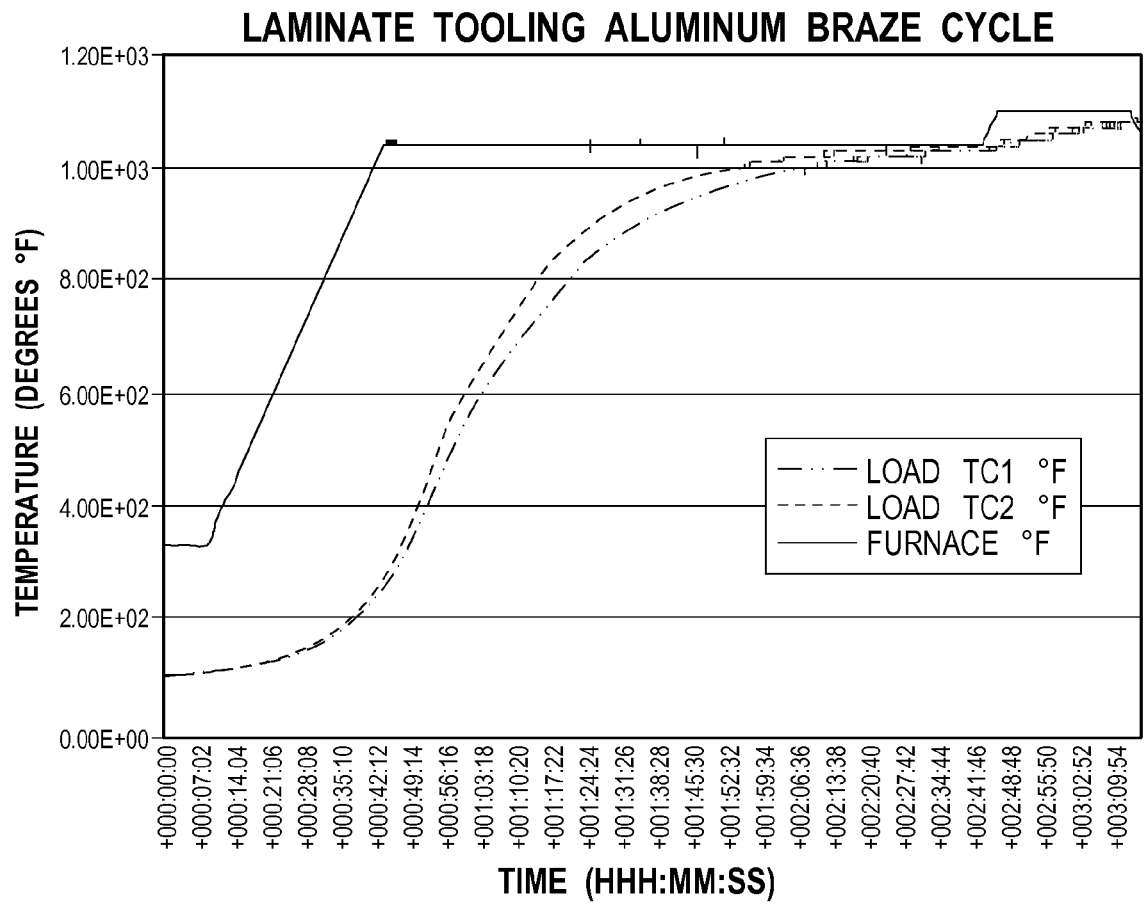
FIG. 14 is a graph of time versus temperature for a braze cycle illustrating another embodiment of the invention.

With the furnace pre-heat cycle complete and the braze fixture set-up complete, the aluminum braze cycle, is initiated as illustrated in FIG. 14 with the temperatures of the furnace, and the load thermocouples TC1, TC2 graphed versus time. The vacuum furnace chamber is backfilled with nitrogen. Then, the furnace door is opened and the braze fixture 68 is loaded in the furnace. The furnace door is closed, and the furnace chamber is pumped down to 100 µm. Then the chamber is backfilled with nitrogen to a ten inch vacuum, which is repeated three times. Next the chamber is pumped down to less than $10^{-4}$ torr. Subsequently the furnace temperature is ramped to 300 degrees Fahrenheit and maintained for one minute. The furnace temperature is then ramped to 1040 degrees Fahrenheit plus or minus five degrees Fahrenheit at a rate of twenty degrees Fahrenheit per minute. This temperature is maintained until the load thermocouples reach 1040 degrees Fahrenheit plus or minus five degrees Fahrenheit. The furnace temperature is then ramped to 1100 degrees Fahrenheit at a rate of twenty degrees Fahrenheit per minute until the load thermocouples reaches 1080 degrees Fahrenheit plus or minus five degrees Fahrenheit. The heat is disabled and the chamber is backfilled with nitrogen until the furnace door is opened. The load thermocouples are removed and the braze fixture 68 is removed from the furnace. The furnace door is closed, and the brazed laminate components 48 are air cooled in the braze fixture 68 under load until the component temperature is less than 500 degrees Fahrenheit. While cooling to room temperature, when the laminate parts 48 reaches 985 degrees Fahrenheit, the heat can be turned off for cooling at maximum rate to room temperature. The braze fixture is disassembled and the brazed laminate components 48 are removed.

Additional heat treatment of the brazed laminate components 48 may be employed, depending on the final material specifications. Solution heat treatment of the 6061 laminate components 48 may be utilized, and a standard water quench process can be used to achieve the T4 condition of the 6061 aluminum. The 6061 laminate components 48 may then be age hardened to a T6 condition.

Figure 15:
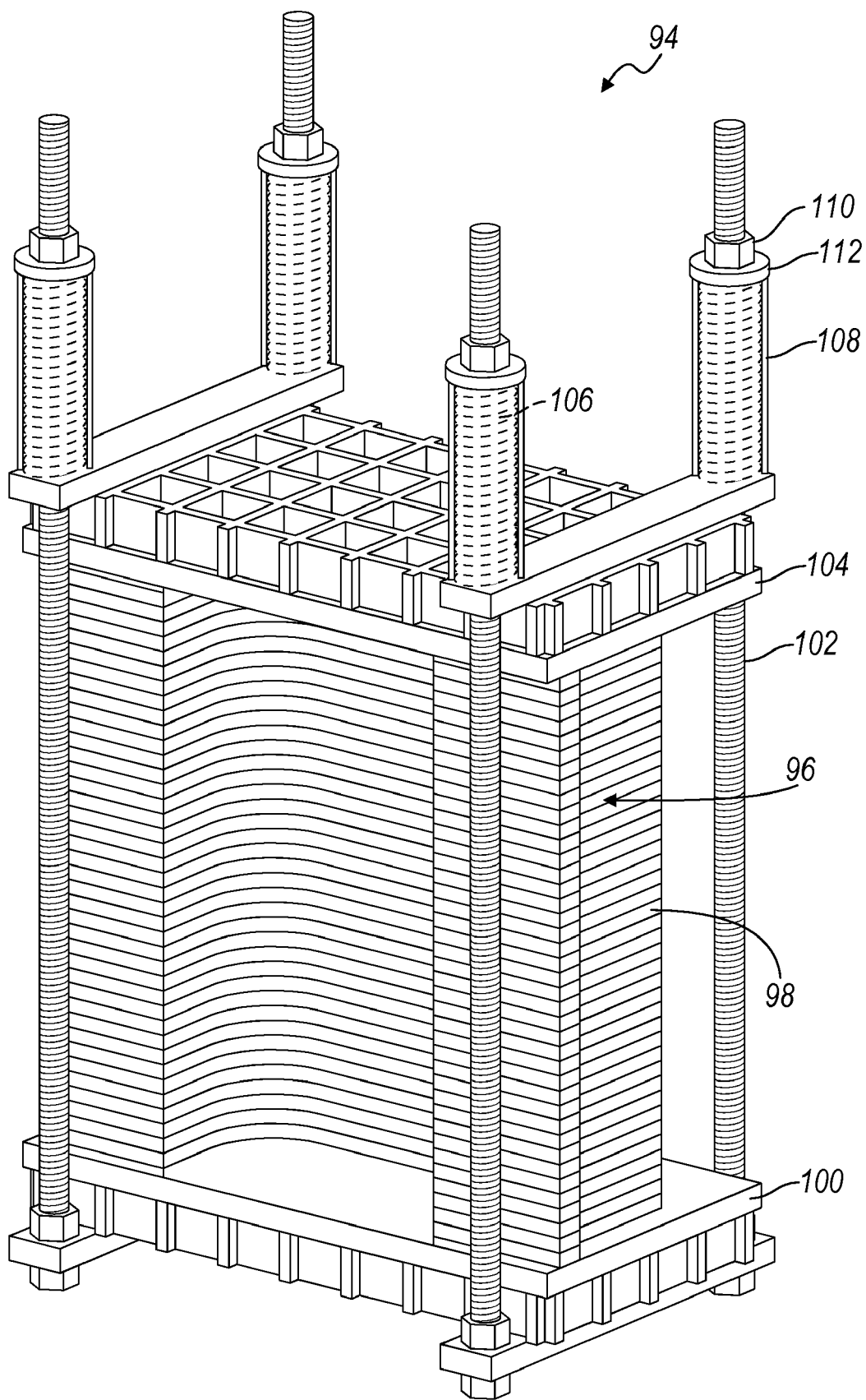
FIG. 15 is a perspective view of another braze fixture illustrating another embodiment of the invention.

Of course various brazing fixture variations may be employed under the spirit and scope of the invention. The varying geometries of tools may result in various configurations of the brazing fixture. Referring now to FIG. 15, a brazing fixture 94 is illustrated for fixturing another laminate tool 96. The laminate tool 96 depicted utilizes more plates 98 than previous embodiments resulting in a larger height to width ratio and a larger height to depth ratio. The fixture 94 includes a lower platen 100 formed from 304 stainless steel. The laminate tool is placed upon the lower platen. A plurality of threaded rods 102 are fastened to the lower platen 100 about the perimeter of the laminate tool 96 and extend above the height of the laminate tool 96. The threaded rods 102 may also be formed from 304 stainless steel. An upper platen 104 is placed upon the laminate tool 96 in sliding engagement with the threaded rods 102. The upper platen 104 is also formed from stainless steel. A plurality of coil springs 106 are each placed about one of the threaded rods 102 in engagement with the upper platen 104. The coil springs 106 are each formed from a high temperature alloy such as Inconel® 750X.

A stainless steel tube 108 is placed about each spring 106. The tubes 108 may each provided at a length that is less than the overall spring 106 length and that is equivalent to the designed load per spring 106 rate. Subsequently, a nut 110 and washer 112 (both may also be formed from stainless steel) are placed upon each threaded rod 102. The nuts 110 are tightened until the washers 112 engage the tubes 108, thereby compressing the springs 106 to collectively provide the desired load to the laminate tool 96.

The management, and/or minimization, of braze alloy flow during brazing process, for large braze surface areas, via design of internal passages, thermal mass, geometry, and vent/drain plate prevents erosion of base metal due to control of braze alloy flow in liquid state. As a result, porosity free braze joints and superior braze joint quality are obtained. Therefore, the process allows the manufacturing of conformal cooling channels (pressure vessels) required for the described tooling.

Optimization of laminate component 48 cooling efficiency by conformal cooling with undulations in conformal cooling channels induces turbulent cooling flow, with a reduction in thermal mass resulting in reduced energy storage.

An aluminum braze fixture with low thermal mass minimizes/prevents heat sink with brazed components, maintains high temperature strength to ensure flatness of parts and uniform distribution of forces.

Engineered weight distribution on the laminate tool 48 throughout the braze process generates uniform braze joint thickness and maintains flatness, resulting in uniform mechanical and thermal properties.

The utilization of the mechanical and chemical cleaning process to deoxidize the base metal and the braze alloy enhances brazability of required surfaces.

The utilization of Magnesium turnings prevents oxide formation on brazed surfaces during the vacuum furnace brazing cycle.

The aluminum brazed laminate tool provides mechanical properties near or equivalent to that of the base metal.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for forming a laminate aluminum mold block for forming an article in a forming operation comprising:
    forming a series of aluminum laminate flat plates with channels to collectively form a tool body;
    forming draining apertures through the series of aluminum laminate plates in a thickness direction of the plates, the draining apertures being separate from the channels;
    forming a series of aluminum brazing layers for brazing together adjacent aluminum laminate plates;
    deoxidizing the series of aluminum laminate plates and the series of aluminum brazing layers;
    stacking the series of aluminum laminate plates alternating with the aluminum brazing layers between adjacent aluminum laminate plates;
    pressing the stacked series of alternating aluminum plates and aluminum brazing layers;
    heating the stacked series of alternating aluminum plates and aluminum brazing layers to a temperature wherein the aluminum brazing layers braze the aluminum laminate plates together, wherein excess braze material drains out of the tool body through the draining apertures during the heating; and
    forming a finished surface in the tool body by the brazed series of aluminum laminate plates.

2. The method of claim 1 further comprising forming the series of aluminum brazing layers from aluminum foil sheets.

3. The method of claim 1 further comprising forming the series of aluminum laminate plates and forming the series of aluminum brazing layers without a flux.

4. The method of claim 1 further comprising:
    determining a maximum distance from a perimeter of the tool body, wherein imperfections in the braze are permitted;
    analyzing a sample tool after the brazing process; and
    if any imperfections are discovered beyond the maximum distance permitted,
    reducing a thermal mass of the tool body or a brazing fixture in order to reduce the brazing cycle.

5. The method of claim 1 wherein deoxidizing the series of aluminum laminate plates further comprises abrading the surfaces of the series of aluminum laminate plates.

6. The method of claim 5 wherein abrading the surfaces of the series of aluminum laminate plates further comprises sanding the surfaces of the series of aluminum laminate plates.

7. The method of claim 5 wherein abrading further comprises utilizing a silicon carbide abrasive.

8. The method of claim 1 further comprising heating the stacked series of alternating aluminum plates and aluminum brazing layers in a vacuum furnace.

9. The method of claim 8 further comprising placing Magnesium within the furnace to minimize oxidation of the series of alternating aluminum plates and aluminum brazing layers during heating in the vacuum furnace.

10. The method of claim 8 wherein heating the stacked series of alternating aluminum plates and aluminum brazing layers in the vacuum furnace further comprises heating at a temperature of at least 1040 degrees Fahrenheit.

11. The method of claim 8 wherein heating the stacked series of alternating aluminum plates and aluminum brazing layers in the vacuum furnace further comprises heating at an atmosphere of $10^{-4}$ to $10^{-5}$ torr.

12. The method of claim 1 further comprising forming the series of aluminum laminate plates with cooling channels.

13. The method of claim 12 further comprising piercing the aluminum brazing layers at locations aligned with the cooling channels in the series of aluminum laminate plates to expose the cooling channels to an external environment during the heating of the series of aluminum plates and the series of aluminum brazing layers.

14. The method of claim 12 further comprising stacking the series of aluminum laminate plates and aluminum brazing layers upon a base plate with venting aligned with the cooling channels so that the cooling channels are exposed to an external environment during the heating of the series of aluminum plates and the series of aluminum brazing layers.

15. The method of claim 1 wherein pressing the stacked series of alternating aluminum plates and aluminum brazing layers further comprises applying a force to the series of alternating aluminum plates and aluminum brazing layers during the heating of the series of alternating aluminum plates and aluminum brazing layers.

16. The method of claim 15 further comprising:
   providing a brazing fixture having a base a frame and a top;
   placing the stacked series of alternating aluminum plates and aluminum brazing layers on the base; and
   installing at least one spring between the top and stacked series of alternating aluminum plates and aluminum brazing layers for pressing the stacked series of alternating aluminum plates and aluminum brazing layers during heating.

17. The method of claim 16 further comprising providing the at least one spring from an austenitic nickel-chromium-based superalloy sheet.

18. The method of claim 16 further comprising:
   providing a first stainless steel base plate upon the fixture base;
   providing an aluminum vent and drain plate upon the base plate;
   placing the stacked series of alternating aluminum plates and aluminum brazing layers upon the vent and drain plate;
   providing a second stainless steel base plate upon the stacked series of alternating aluminum plates and aluminum brazing layers; and
   providing at least one tubular member upon the second base plate;
   wherein the at least one spring is installed between the at least one tubular member and the fixture top.

19. The method of claim 1 further comprising cladding the series of aluminum brazing layers to the series of aluminum laminate plates.

20. A method for forming an article comprising:
   forming a mold block according to the method of claim 1; and
   forming an article from the finished surface of the mold block.

* * * * *